No. 854,656. PATENTED MAY 21, 1907.
G. LESKE.
DEVICE FOR DISENGAGEABLE COUPLING OF TWO OBJECTS.
APPLICATION FILED MAR. 4, 1907.
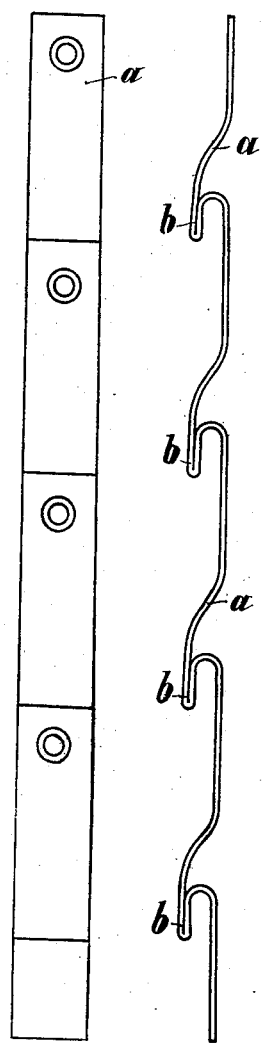
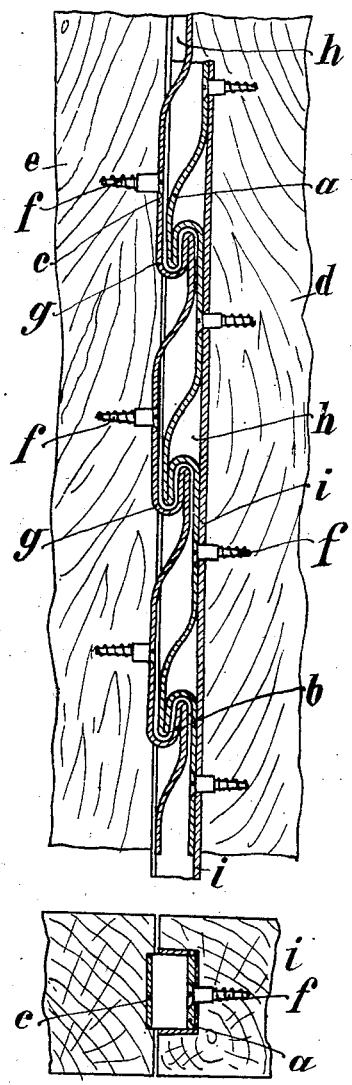

UNITED STATES PATENT OFFICE.

GUSTAV LESKE, OF BERLIN, GERMANY.

DEVICE FOR DISENGAGEABLE COUPLING OF TWO OBJECTS.

No. 854,656.     Specification of Letters Patent.     Patented May 21, 1907.

Application filed March 4, 1907. Serial No. 360,523.

*To all whom it may concern:*

Be it known that I, GUSTAV LESKE, manufacturer, a subject of the Emperor of Germany, residing at No. 70 Blumenstrasse, Berlin O, Kingdom of Prussia, German Empire, have invented certain new and useful Improvements in or Relating to Devices for Disengageable Coupling of Two Objects; and I do hereby declare the following to be a full, clear, and exact description of the invention, such as will enable others skilled in the art to which it appertains to make and use the same.

The invention concerns improvements in or relating to devices for the disengageable coupling of two objects by metal bands which are fastened on the two parts to be joined, and which bands form several hook-formed projections of the same form and arrangement and which are arranged at 180° to each other. The novelty consists in a special form and fastening of the hooks whereby a greater firmness is given to the same and whereby it is made possible to produce them in any number desired and by bending out of the metal band.

In the drawing the new coupling is represented in two examples.

Figures 1 and 2 show a metal band or strip in side and front view and Figs. 3 and 4 a section through two metal bands which have been coupled with each other. Fig. 5 shows the mode of producing the hook strips, while Fig. 6 exhibits a special pattern of the hooks.

The metal band or strip *a* forms a number of regular hooks *b* of similar form. They are so produced by bending that the bent part is parallel to the part not bent. At the point of each hook the metal band is bent outward at 180°, so that it lies on the unbent portion of the hook, this is therefore doubled. The metal band is then led back in an arc into its original plane so that it can anew be bent to a hook. Two such strips *a* and *c* are in any way desired, for example by screws *f* in well known manner so fastened on the opposite surfaces of the objects to be coupled that they are set at 180° to each other. The one strip lies suitably in a rabbet *h* within a channel or U-iron *i*.

The production of the hooks from a metal strip takes place in the manner represented in Fig. 5. The straight bandiron is first so bent by rollers that it assumes a regular waveform *k*, whereupon it comes under further rollers which press the waves toward one side as is to be seen at *m*. Further rollers then produce the correct hook-form, whereby a suitable hold-up laid in the hooks prevents the same being too closely bent together. The hooks can also receive the form of double hooks (Fig. 6). This form is distinguished from that of Figs. 1 to 5 by having each second hook *n* set in opposition, that is at 180°, to the first *o* and close to the same.

The coupling of the two hooks is effected by their being pushed into one another by side pushing. To make this possible the distance *v—w* Fig. 6 must be equal to the distance *x—y* Fig. 6. The production of this hook-form takes place as shown in Fig. 5, except the regular waves are not pressed by the rollers to one side but to both sides.

The number of hooks on each metal band and the length of the same is as may be wished. The range of application of the new coupling is extensive, it can be applied to furniture, to the connection of parts of furniture, on walls for fixing a partition wall, on ships for fixing articles on the same etc. Since the metal bands can be easily bent and also in the bent position always correspond to each other the joint can also be applied to the coupling of two bent objects.

Having now particularly described and ascertained the nature of my said invention and in what manner the same is to be performed, I declare that what I claim is:

1. A coupling device comprising two members each consisting of a metal strip bent outward and backward at intervals to form open hooks, the two members arranged in opposition to each other with their respective hooks in engagement.

2. A coupling device comprising two members each consisting of a metal strip bent outward and directly backward at intervals to form open hooks, the two members arranged in opposition to each other with their hooks opening in opposite directions and in engagement.

3. A coupling device comprising two members each consisting of a metal strip bent outward and backward to form open hooks, then bent closely upon itself in the forward direction and extending in a gradual curve to the former plane of the strip, and then bent as before to form other hooks at intervals, the two members arranged in opposition to each other and at an angle of 180° with their respective hooks in engagement.

4. The combination, with two articles to be secured together, of a coupling member secured to the face of each of said articles, said member consisting of a metal strip extending in a general vertical direction and bent outward and backward at intervals to form a succession of open hooks, the two articles arranged with their faces in opposition to each other with the hooks of their respective coupling members in engagement.

5. The combination, with two articles to be secured together, of a coupling member secured to the face of each of said articles, said member consisting of a metal strip extending in a general vertical direction and bent outward and backward to form open hooks, then bent closely upon itself in a forward direction and extending in a gradual curve to the former plane of the strip, and then bent as before to form other hooks at intervals, the two articles arranged with their faces in opposition to each other with the coupling members at an angle of 180° to each other and with their respective hooks in engagement.

6. The combination with two articles to be secured together, of a coupling member secured to the face of one of said articles, a second coupling member secured within a channel below the face of the other of said articles, each coupling member consisting of a metal strip extending in a general vertical direction and bent outward and backward at intervals to form a succession of open hooks, the two articles arranged with their faces in opposition to each other with the hooks of their respective coupling members in engagement.

7. The combination, with two articles to be secured together, of a coupling member secured to the face of one of said articles, a channel iron seated below the face of the other of said articles, a second coupling member secured within the channel iron, each of said coupling members consisting of a metal strip extending in a general vertical direction and bent outward and backward at intervals to form a succession of open hooks, the two articles arranged with their faces in opposition to each other with their respective coupling members at substantially 180° to each other with their hooks in engagement.

In testimony whereof I hereunto affix my signature in the presence of two witnesses.

GUSTAV LESKE.

Witnesses:
  HENRY HASPER,
  WILLIAM MAYNER.